United States Patent Office 3,274,341
Patented Sept. 20, 1966

3,274,341
SERIES-PARALLEL RECIRCULATION TIME COMPRESSOR
Willard B. Allen, San Diego, Calif., assignor to the United States of America as represented by the Secretary of the Navy
Filed Dec. 17, 1962, Ser. No. 245,328
12 Claims. (Cl. 179—15.55)

The invention described herein may be manufactured and used by or for the Government of the United States of America for governmental purposes without the payment of any royalties thereon or therefor.

The present invention relates generally to data processing equipment and in particular is a method and means for time-compressing electrical signals so that their information rate is effectively increased without adversely affecting the continuity and sequence patterns thereof.

In the past, the maximum input information rate and storage capacity of signals being time-compressed could only be effected by increasing the operating frequency of the delay element incorporated in the processing equipment. Although satisfactory for some purposes, the aforementioned frequency limitation of the delay element also limited the signal time compressioned and, consequently, the output information rate for signal analysis purposes was also limited in many practical instances.

The present invention overcomes most of the disadvantages of the prior art by increasing the flexibility of recirculation type time compressors. This is accomplished by the novel interconnection of delay lines and associated devices in such manner as to increase the sampling rate and storage capacity thereof.

It is, therefore, an object of this invention to provide an improved method and means for time compressing a series of data signals.

Another object of this invention is to provide a method and means for increasing the information input rate and storage capacity of Deltic type devices without increasing the operating frequency of the acoustic delay elements thereof.

A further object of this invention is to provide a series-parallel recirculation signal time compressor.

A further object of this invention is to provide a signal time compressor having improved flexibility of input and output sample rates.

Still another object of this invention is to provide an improved signal time compressor that may be easily and economically manufactured and maintained.

Other objects and many of the attendant advantages of this invention will be readily appreciated as the same becomes better understood by reference to the following detailed description when considered in conjunction with the accompanying drawings wherein.

Figure 1:
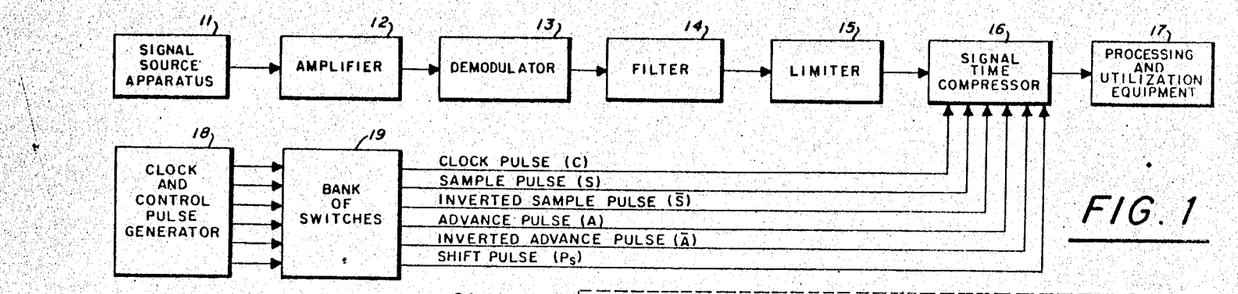
FIG. 1 is a block diagram representation of an examplary signal source and processing system which may be incorporated in the series-parallel recirculation time compressor of this invention to an advantage.

Referring now to FIG. 1, a typical utilization system incorporating the subject invention is shown as having a signal source apparatus 11 which may, for example, be an echo-ranging device such as a sonar set or a radar set, communication system, or any other type of electrical equipment requiring analysis of the output signals therefrom in time-compressed relationship. The output from signal source apparatus 11 is amplified by an amplifier 12, then preferably but not necessarily demodulated by a demodulator 13, appropriately filtered by a filter 14, and finally limited by a limiter 15 to effect a binary type of output signal which is suitable for further processing in a signal time compressor 16 of the type constituting this invention. The output of said signal time compressor 16, of course, may be applied to any pertinent processing and utilization equipment 17 such as, for example, a readout or data computation system, as desired.

In other that the compression operation will take place at such times as will cause reproduction of the input signal to be effected in the output signal time compressor 16 except for the time compression thereof, it becomes necessary to provide the proper clock and control pulses for instigating and carrying out the timing and actuation operations. A clock and control pulse generator 18 produces said timing signals. After passing through an appropriate bank of switches 19, which may be opened or closed as desired to allow said timing signals to either pass or not to pass, respectively, therethrough, they are applied to the inputs of signal time compressors 16 as a clock pulse (C), a sample pulse (S), an inverted sample pulse ($\bar{S}$), a shift pulse ($P_s$), an advance pulse (A), and an inverted advance pulse ($\bar{A}$).

Figure 2:
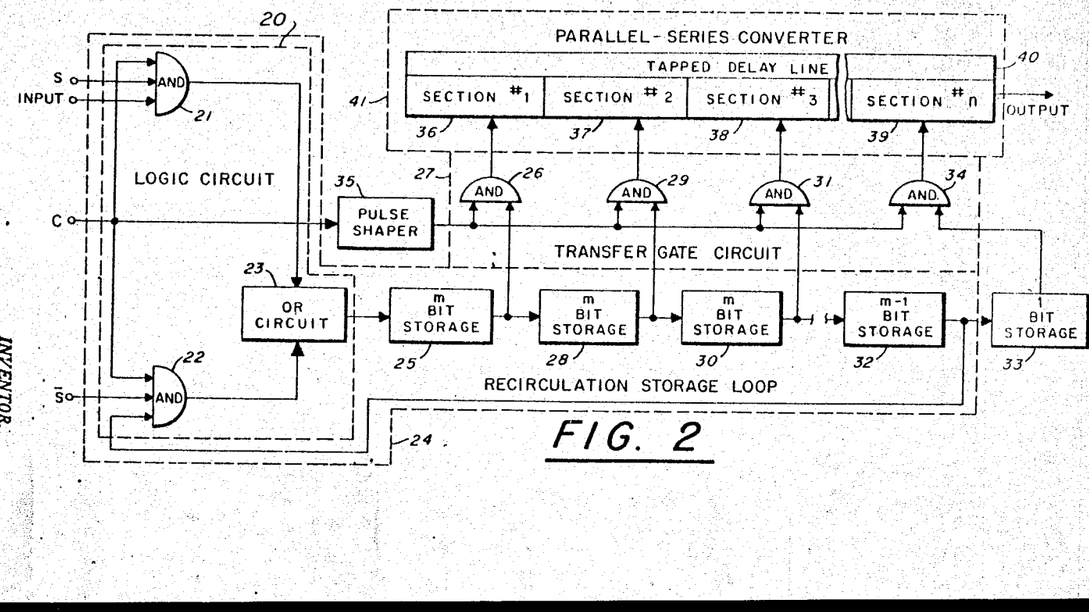
FIG. 2 is a block diagram which represents a very general embodiment of the series-parallel recirculation time compressor of this invention.

The generalized embodiment of the subject series-parallel recirculation time compressor of this invention is disclosed in FIG. 2 as containing an input logic circuit 20 having an AND gate 21, an AND gate 22, and an OR circuit 23. AND gates 21 and 22 are of the type which have three inputs and a single output and when the three inputs signals to each thereof occur simultaneously or in coincidence with each other, the respective output therefrom occurs at the same time. In this particular case, the signals suplied as the inputs to AND gate 21 are the input data signal to be processed, the aforesaid sample pulse, and the clock pulse. AND gate 22 also receives as one of the inputs thereto the aforementioned clock pulse, but in addition, said inverted sample pulse and a feedback signal to be described in more detail subsequently is also applied thereto.

The output from AND gates 21 and 22 are both applied to their respective inputs of an OR circuit 23. As is conventional in such OR circuits, the input signal having the greater amplitude is passed therethrough at any given instant for further processing and, in this case, it is applied to an "m" bit storage 25 of a recirculation storage loop 24. The output of "m" bit storage 25 is simultaneously applied to one of the inputs of an AND gate 26 of a transfer gate circuit 27 and the input of another "m" bit storage 28. The output of "m" bit storage 28 is likewise applied to one of the inputs of an AND gate 29 of said transfer gate circuit as well as to another "m" bit storage 30, the output of which is also applied to another AND gate 31 of transfer gate circuit 27 and an "m−1" bit storage 32.

The output of "m−1" bit storage 32 constitutes the output of the aforesaid recirculating storage loop. Within the loop, however, this output is applied to one of the inputs of the aforesaid AND gate 22 as the aforementioned feedback signal thereto.

The output of "m−1" bit storage 32 is also applied to the input of a "1" bit storage 33. The output of "1" bit storage 33 is then applied as one of the inputs to still another AND gate 34 of transfer gate circuit 27.

The aforesaid clock pulse is also applied through a pulse shaper 35 to each of the other inputs of AND gates 26, 29, 31 and 34, and each of the outputs of AND gates 26, 29, 31 and 34 are respectively applied to sections 36 through 39 of a tapped delay line 40 which, in this particular instance, constitutes a parallel-series converter 41. The output from delay line 40, of course, constitutes the time-compressed signal output.

As can be seen in the typical generalized embodiment represented in FIG. 2, only 5 bit storage devices are disclosed as constituting the recirculation storage loop of this invention. However, it should be understood, that any number of bit storage devices may be used to provide the proper timing and the proper recirculation of the feedback signal through the entire recirculation storage loop as well as the timing of the respective output signals therefrom. Thus, only four sections are likewise disclosed as constituting tapped delay line 40, and only a like number of appropriately associated elements are shown connected between said tapped delay line and the outputs of said recirculation storage loop. Hence, using any number of bit storage devices within the recirculation storage loop, any number of sections within the tapped delay line, and any number of AND gates within the transfer gate circuit may be employed as desired under any given operational circumstances, since so doing would be obvious to the skilled artisan from the teachings herein presented and, therefore, would not violate the scope or the spirit of this invention.

This, then, constitutes the very general structural embodiment of the subject invention which, of course, embodies the broad inventive concept involved therein. Other species disclosing more specifically instrumented structures embodying said concept are defined by the devices illustrated in FIGS. 3 through 6, discussed subsequently.

Figure 3:
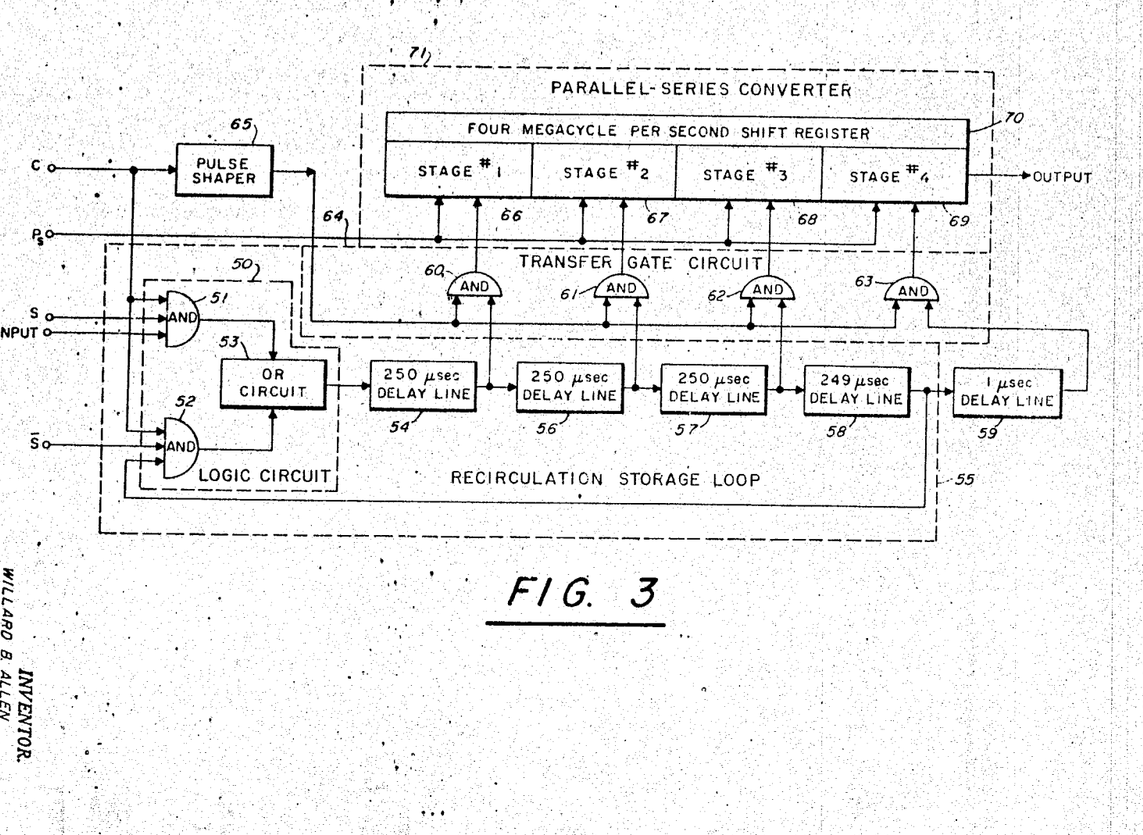
FIG. 3 is a somewhat more specific embodiment of the series-parallel recirculation time compressor of this invention represented in block diagram form.

The embodiment of the invention of FIG. 3 illustrates that it may also incorporate an input logic circuit 50, containing an AND gate 51, an AND gate 52 and an OR circuit 53. The data binary signal to be time compressed is, of course, applied as one of the inputs to AND gate 51, along with the clock and sample pulses. The inputs to AND gate 52 likewise consist of clock pulses, the inverted sample pulses, and a feedback signal to be mentioned later. The output of AND gates 51 and 52 are applied as a pair of inputs to OR circuit 53. This OR circuit selects the one input signal thereto having the greatest amplitude at any given instant and supplies it to a 250 microsecond delay line 54 of a recirculation storage loop 55. The output of delay line 54 is fed through a series of similar 250 microsecond delay lines 56 and 57, the output of which is supplied to a 249 microsecond delay line 58. The output of delay line 58, of course, constitutes the output signal from the aforesaid recirculation storage loop 55. Within said loop the output thereof is applied back as one of the inputs to the aforesaid AND gate 52 as the aforementioned feedback signal thereto. The output of delay line 58 is simultaneously applied to the input of a 1 microsecond delay line 59.

The outputs from delay lines 54, 56, 57, and 59 are respectively applied to one of the inputs of a comparable number of AND gates 60 through 63 of a transfer gate circuit 64. The other inputs thereto are supplied by the clock pulse after it has been appropriately shaped by a pulse shaper 65, and the outputs from AND gates 60 through 63 are respectively applied to a similar number of stages 66 through 69 of a 4 megacycle per second shift register 70 herewith constituting a parallel-series converter 71. In this particular case, for shift purposes, the previously mentioned shift pulse is applied to each of the stages of shift register 70 and this procedure, of course, distinguishes from that of the device of FIG. 2 which requires no such shift pulse, since a tapped delay line is used instead of a shift register. The output of shift register 70 occurs at the last stage thereof and it actually constitutes the time compressed version of the aforesaid binary data signal.

Figure 4:
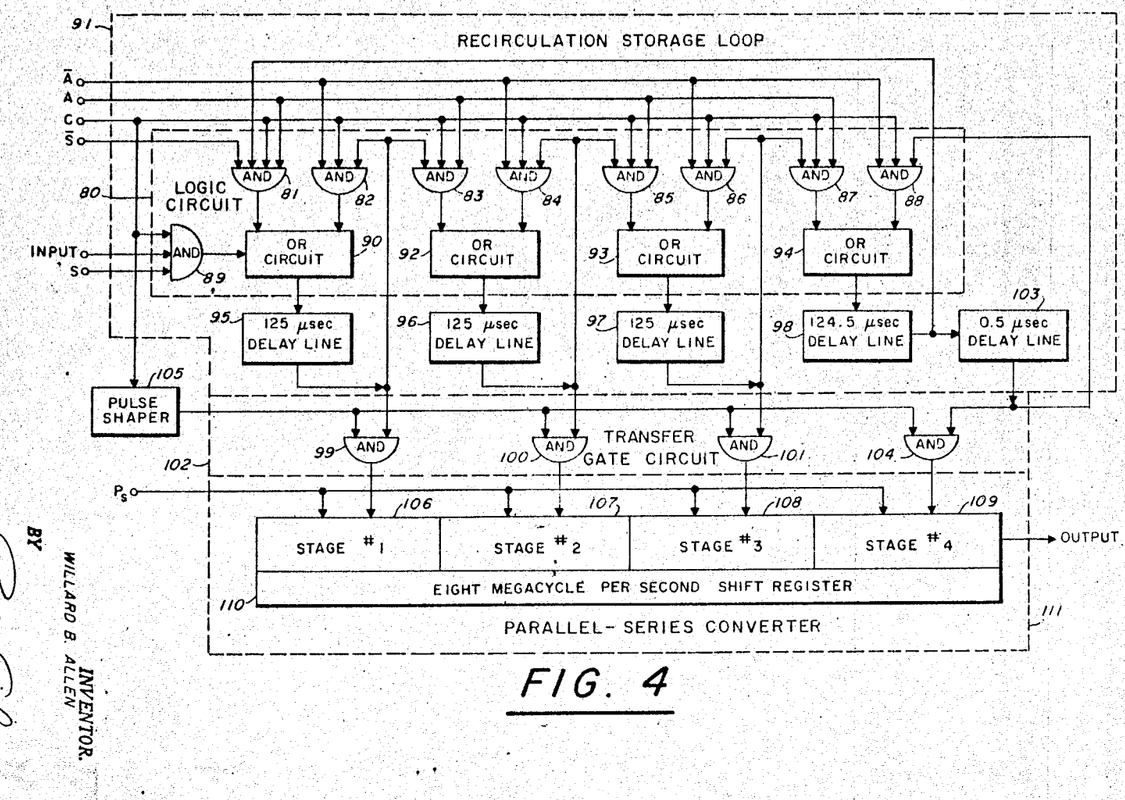
FIG. 4 is another embodiment of the series-parallel recirculation time compressor of this invention which incorporates a more sophisticated logic circuit.

Referring now to FIG. 4, there is shown a more sophisticated embodiment of the subject invention which includes an input logic circuit 80 comprising a plurality of AND gates 81 through 89. With the exception of AND gate 81, all of the aforesaid logic circuit AND gates contain a trio of inputs. As can be seen, however, AND gate 81 is adapted for receiving 4 input signals. AND gate 89 receives as one of the inputs thereto the binary data signal which is to be time compressed. The other input thereto consist of the aforesaid clock and sample pulses. AND gates 81 through 88 likewise receive clock pulses applied thereto. AND gates 81, 83, 85, and 87 are each supplied with advance signals as well as said clock signals, and AND gates 82, 84, 86, and 88 all receive inverted advance pulses, as well as the aforementioned clock pulses. In addition to clock pulses and advance pulses, AND gate 81 also has applied to one of the inputs thereof of the aforementioned inverted sample pulse, along with a feedback signal which will again be referred to subsequently. The outputs of AND gates 81 and 82 are applied to the inputs of an OR circuit 90 of major recirculation storage look 91. Likewise, the outputs of AND gates 83 and 84 are applied to the inputs of an OR circuit 92, the outputs of AND gates 85 and 86 are applied to the inputs of an OR circuit 93 and the outputs of AND gates 87 and 88 are applied to the inputs of an OR circuit 94 of the aforementioned recirculation storage loop. The output of AND gate 89 is applied to one of the inputs of OR circuit 90, which, of course, has a trio of inputs rather than a pair of inputs. The outputs of OR circuits 90, 92, 93, and 94 are respectively connected to the inputs of a 125 microsecond delay line 95, a 125 microsecond line 96, a 125 microsecond line 97, and a 124.5 microsecond line 98. The output of delay lines 95 through 97 are simultaneously applied to one of the inputs of AND gates 82, 84, and 83 and 87, 86 respectively. At the same time they are also respectively applied to one of the inputs of AND gates 99 through 101 of a transfer gate circuit 102. The output of delay line 98 is applied as one of the inputs to the aforementioned AND gate 81 and to the input of a 0.5 microsecond delay line 103, the output of which is simultaneously applied to the input of the aforesaid AND gate 88 and another AND gate 104. The other inputs to AND gates 99, 100, 101, and 104 are supplied by the clock pulse after it has been properly shaped by a pulse shaper 105, and the outputs of said AND gates 99 through 101 and 104 are then respectively applied to one of the inputs of 106 through 109 of an eight megacycle per second shift register 110 herein constituting a parallel-series converter 111. The aforementioned shaped shift pulse is likewise applied to one of the inputs of each of the stages of shift register 110 for the timely shifting thereof. The output of shift register 110 is, of course, obtained from the last stage thereof and it constitutes the time compressed data signal from the subject invention.

As in the devices of each of the previously discussed figures, the device of FIG. 4 may contain a shift register having any number of desired stages connected to the appropriate number of associated components in the recirculation storage loop and the transfer gate circuit to effect the type signal time compression preferred, since so doing would obviously be well within the purview of one skilled in the art having the benefit of the teachings herein presented.

Figure 5:
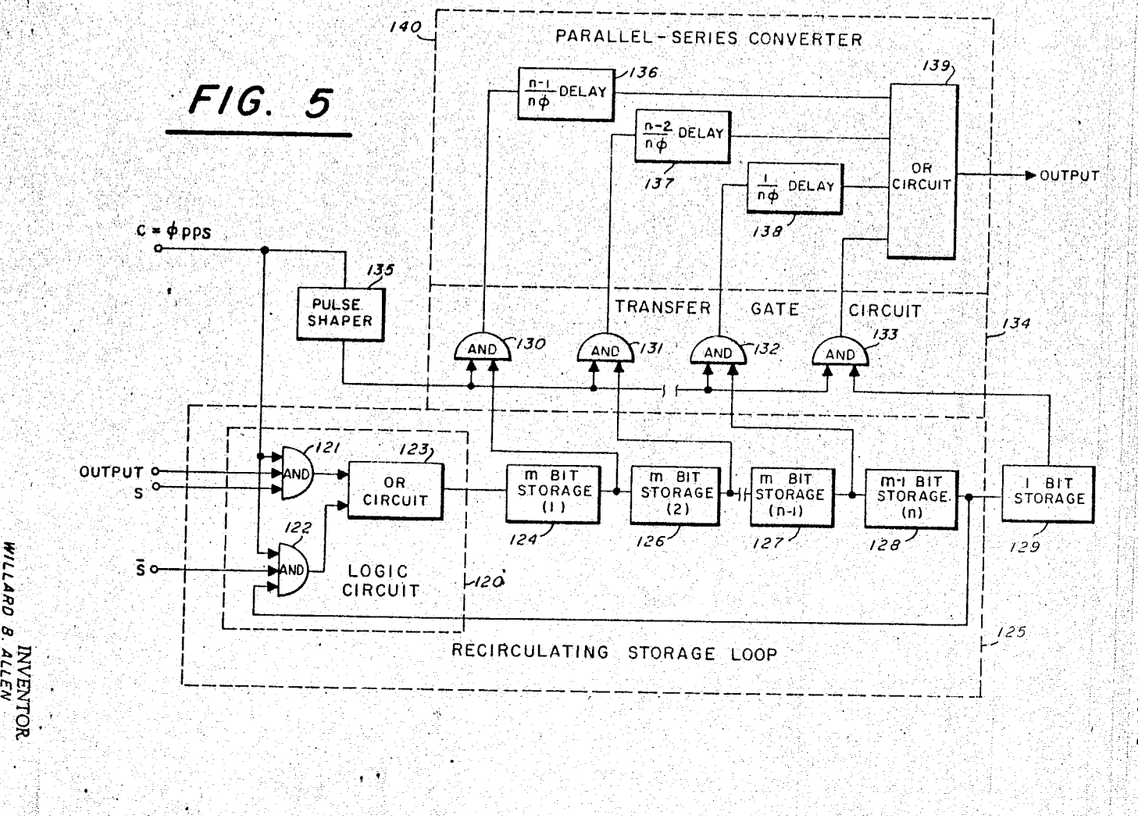
FIG. 5 is a block diagram representation of an embodiment of the subject invention using a plurality of electronic signal delay means in the parallel-series converter.

The embodiment of the invention depicted in FIG. 5 includes a logic circuit 120 having a pair of AND gates 121, 122, and an OR circuit 123. The inputs to these AND gates are similar to the inputs of the devices discussed previously in connection with FIGS. 2 through 4 and the outputs thereof are interconnected and applied to OR circuit 123. The output of OR circuit 123 is coupled to the input of a "m" bit storage 124 of a recirculation storage loop 125. The output of "m" bit storage 124 is coupled through an "m" bit storage 126 and an "m" bit storage 127 to a "m−1" bit storage 128, which are connected in series. The output of "m−1" bit storage 128 is coupled to one of the inputs of the aforesaid AND gate 122 as the feedback signal portion of the aforesaid recirculation storage loop 125. The output of "m−1" bit storage 128 is also coupled to a "1" bit storage 129. The respective outputs of storage devices 124, 126, 127, and 129 are respectively applied to one of the inputs of each of AND gates 130, 131, 132, and 133 of a transfer gate circuit 134. Clock pulses shaped by pulse shaper 135 are then supplied to the other inputs of each of AND gates 130 through 133. The outputs of AND gates 130, 131 and 132 are respectively applied to the inputs of electronic delays 136, 137 and 138 having respective delay times of $n-1/n\varphi$, $n-2/n\varphi$, and $1/n\varphi$, where $n$ is the number of storage elements and $\varphi$ is the clock pulse frequency in pulses per second. The outputs of said delays 136 through 138 and the aforesaid AND gate 133 are applied to an OR circuit 139, the output of which constitutes the time compressed binary signal output.

Figure 6:
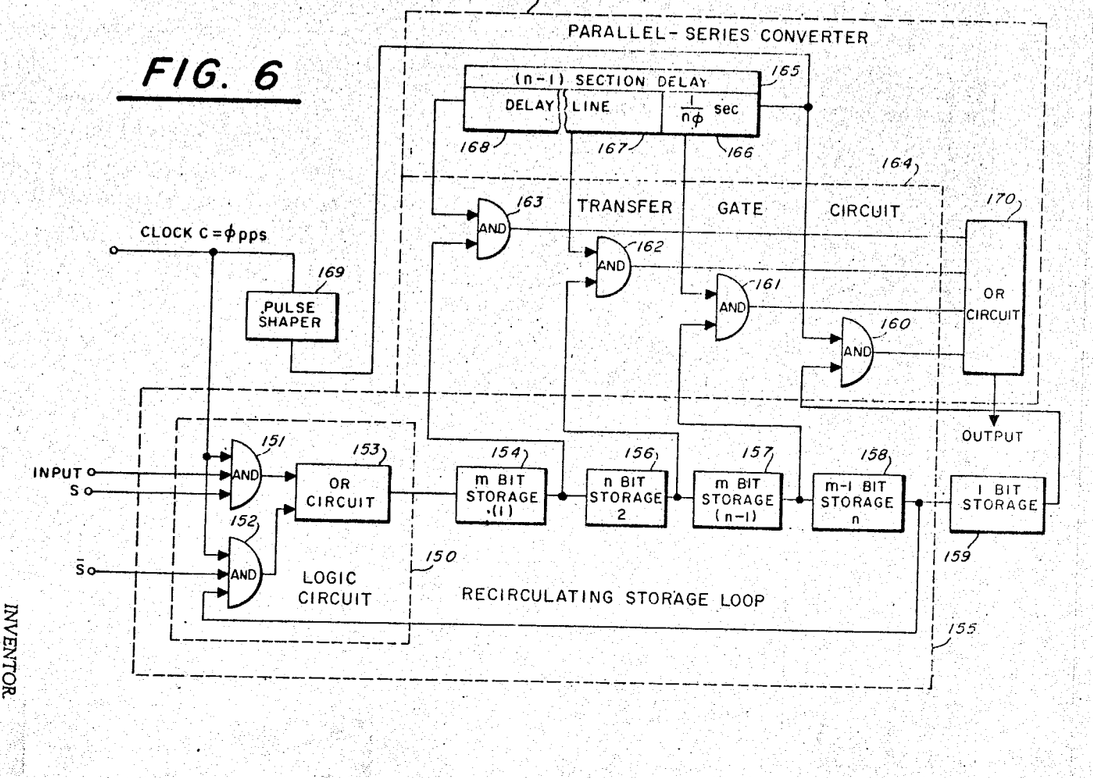
FIG. 6 is a block diagram representation of another embodiment of the subject invention illustrating the use of a multi-section electronic signal delay means in the parallel-series converter.

Referring now to FIG. 6 there is shown still another embodiment of the subject invention as having a logic circuit 150 which includes an AND gate 151, and an AND gate 152, and an OR circuit 153. The inputs of AND gates 151 and 152 are similar to those previously defined in connection with FIGS. 1 through 5 and the outputs thereof are likewise applied to OR circuit 153. The output of OR circuit 153 is applied to the input of an "m" bit storage 154 of a recirculating storage loop 155. The output of "m" bit storage 154 is connected through series connected "m" bit storages 156, 157, and "m−1" bit storage 158. The output of "m−1" bit storage 158 is connected to one of the inputs of the aforementioned AND gate 152 and this connection, of course, constitutes the feedback portion of recirculating storage loop 155. The output of "m−1" bit storage 158 is also applied to the input of a "1" bit storage 159, the output of which is coupled to one of the inputs of an AND gate 160. The outputs of storage devices 157, 156, and 154 are respectively applied to one of the inputs of each of AND gates 161, 162, and 163 of a transfer gate circuit 164. An "n−1" section delay line 165 has a plurality of sections each of which has a time delay $1/n\varphi$ and each of which are referenced successively as sections 166, 167, and 168. These are respectively applied to the other inputs of each of the aforementioned AND gates 161, 162 and 163. Clock pulses are shaped within a pulse shaper 169 before being applied as the input to delay line 165 and the other input to the aforementioned AND gate 160. The outputs of AND gates 160 through 163 are each applied to the input of an OR circuit 170. In this particular case, of course, the aforementioned "n−1" section electronic delay line 165 and the last mentioned OR circuit 170 constitute a parallel-series converter 171, with the output of OR circuit 170 likewise being the output of a parallel-series converter 171 and the subject invention as well because the time compressed output binary signal is supplied thereby.

With the respect to the devices of all of the foregoing FIGS., it should be understood that all of the elements and components thereof depicted in block diagram form are well known and conventional per se and that it is their interconnection and interaction which results in the new and novel system constituting the subject invention.

Before going into the details of the operation of the invention itself, it should be understood that a plurality of well known conventional pulse type signals such as those mentioned in conjunction with the description of the device of FIG. 1 are necessary for the operation of the invention. These pulses, of course, are supplied from some appropriate external source which may or may not be incorporated in this invention. In an attempt to define said signals, an idealized version thereof has been illustrated in FIG. 7, along with an exemplary demonstration of a typical binary input signal to be time-compressed. The latter is represented by the asymmetrical binary signal shown in FIG. 7(a). That portion of the binary signal shown, is actually 32 sample periods or $32\times250$ microseconds=8000 microseconds. However, normally the time before the signal is repeated would be greater than $1000\times250$ microseconds=0.25 seconds.

FIGS. 7(b) through (g), respectively represent sample pulse (S), inverted sample pulse (S), shift register shift pulse ($P_s$), clock pulse (C), advance pulse (A), and inverted advance pulse (A). As a general rule, the aforesaid shift register pulse signal should preferably have a frequency of 8 megacycles per second when used in conjunction with 125 microsecond acoustic delay lines as arranged in the device of FIG. 4. Otherwise, said shift register pulse may be as shown in FIG. 7(d) or have any frequency which will perform the desired shift register operation at the proper time.

FIG. 7(h) represents a time-compressed version of FIG. 7(a). In order to maintain a fairly reasonable time basis as the abcissa of the graphical form of the presently discussed signals, actually two successive replicas of the original input of FIG. 7(a) is depicted in FIG. 7(h).

It should, therefore, be understood that in view of the high frequency of the waveforms of the foregoing actuating signals as well as the complexity of the binary input signal it is difficult if not impossible from a practical standpoint to illustrate their respective waveforms accurately and in detail in the drawing. Thus, the waveforms graphically shown in FIG. 7 of the drawing should be considered merely as typical idealized waveforms which attemp to show their relative frequencies, although not on the same time basis.

Figure 7:
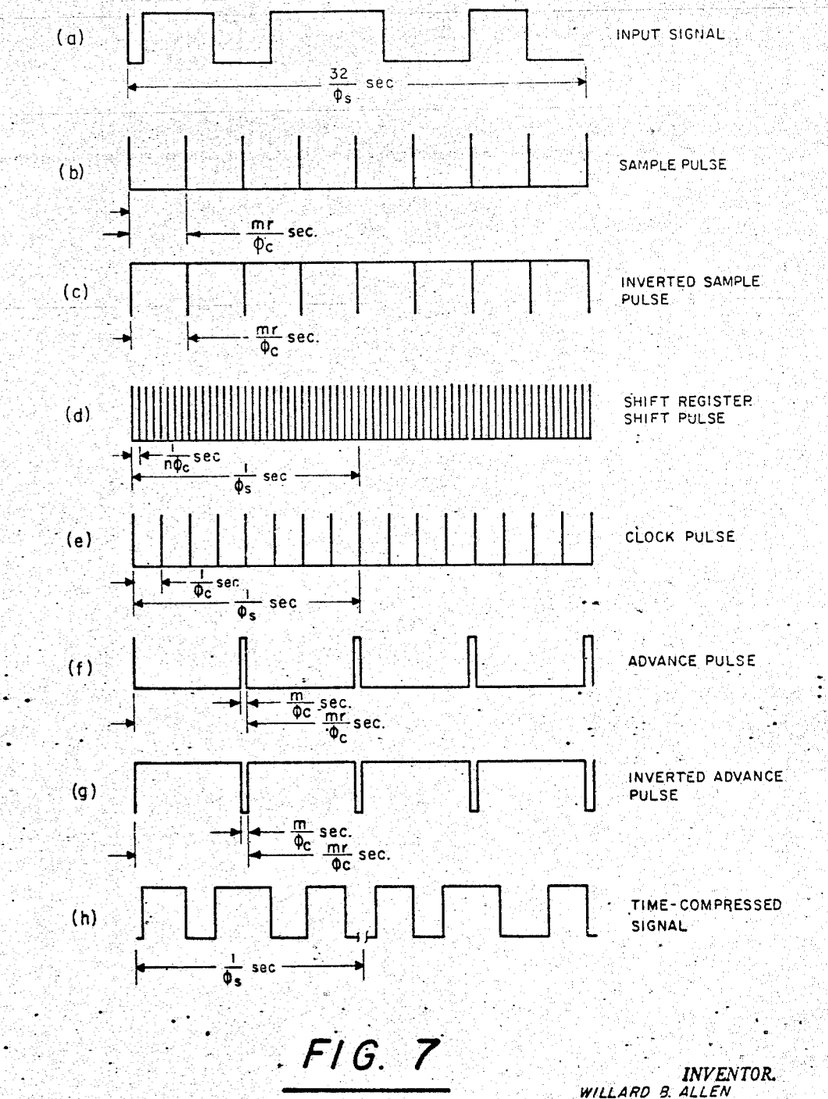
FIGS. 7(a)–(h) are graphical representations of ideal waveforms of typical clock and other control signals which are employed in conjunction with the subject series-parallel recirculation time compressor for regulating the operational sequences thereof to effect desired signal time compression characteristics.

As can be seen from all of the structural figures of the drawing, that is, FIGS. 2 through 6, the appropriate signals exemplarily illustrated in FIG. 7 are respectively applied to each of the embodiments of the subject invention as necessary and appropriate to make them perform their intended recirculation time-compression operation.

The operation of the subject invention as embodied in the devices of FIG. 1 through 6 will now be discussed briefly in connection with the waveforms of FIG. 7.

Because the input data signal to the signal time compressor is preferably of the binary form, the original signal from the signal source apparatus is preferably processed by an appropriate signal shaping circuit. As shown in FIG. 1, said input signal from signal source apparatus 11 is first amplified to produce a signal of sufficient strength to be operated on further and still retain the required intelligence or data characteristics in spite of any extraneous noise signals or other spurious signals that may be associated therewith. It may then be demodulated or not as desired to eliminate any spurious super imposed high frequency modulations which have no useful aspects, and then it is filtered to fall within a predetermined range of processing frequencies. To further effect binary characteristics, said signal is converted thereto by means of an appropriate limiter. At this point, the original data signal has been formed into a binary type signal suitable for being time compressed. Of course, it also retains whatever useful information it originally contained after time compression thereof is effected, and it is then passed on in its time-compressed condition to the processing and utilization equipment 17, in accordance with the flow diagram exemplarily represented by the system of FIG. 1.

Individual versions or species of the subject signal time compressor itself will now be discussed with respect to their respective figures. FIG. 2 illustrates that the binary data input of the type typically represented by the waveform of FIG. 7(a) is applied to one of the inputs of AND gate 21 and when the application thereof occurs in coincidence with the clock pulses having a frequency of "$\phi_0$" pulses per second and the sample pulse of the type exemplarily depicted in FIGS. 7(e) and (c), respectively, the signal emanates from AND gate 21 and is supplied to one of the inputs of circuit 23. Actually, it may be logically considered that sample pulse (S), which occurred every "m" clock pulses, injects a new signal through OR circuit 23 into the first "m" bit storage 25, and its complement, inverted sample pulse (S̄), applied to AND gate 22 simultaneously, rejects the oldest stored sample stored in "m−1" bit storage 32. "m" clock pulses after the first sample pulse injects a sample pulse into "m" bit storage 25, the storage sample pulse appears at the output thereof and enters "m" bit storage 28 and is also applied to one of the inputs of AND gate 26. At the same time, another sample pulse arrives at AND gate 21 and injects a new sample into it. This operation repeats and subsequently, each of the storages 25, 28, 30, 32, and 33 have a sample stored therein and applied to their respectively associated AND gates 26, 29, 31, and 34.

"m−1" clock pulses later, the first storage sample has traveled through "m−1" bit storage 32 and back through AND gate 22 and OR circuit 23 to "m" bit storage 25. The "m+1" sample pulse injects a new signal sample behind it. After "nm−1" sample pulses, the storage elements will all be filled with samples, and, on the next sample pulse, the oldest stored sample will be rejected and a new sample injected in its place. Each clock pulse will cause a sample to be fed from the output of each storages 25, 28, 30 and 33 through AND gates 26, 29, 31, and 34 to their respective sections 36 through 39 of tapped delay line 40, and the samples thereof then travel to the output in sequence between clock pulses, in accordance with the physical and delay characteristics thereof. Because the delay of each section of the delay line should be such that all of the samples from the AND gates can sequentially travel to the delay line output within the time occurring between adjacent clock pulses, the amount of delay designed late each delay section should preferably be equal to or slightly less than the period of the clock pulses divided by the number of delay sections in the delay line. Of course, inasmuch as both the clock frequency (and, hence, the clock period) and the number of delay sections incorporated in the delay line are design choice parameters determined by the operational circumstances, no exact figures are given for them.

The device of FIG. 3 is a somewhat more specific example of the generalized version of the time compressor shown in FIG. 2. Instead of bit storages, microsecond acoustic delay lines are used and the tapped delay line is replaced with a four megacycle shift register. After processing as before by logic circuit 50 (containing AND gates 51 and 52 and OR circuit 53), the input data signal is serially fed into 250 microsecond delay lines 54, 56, and 57, 249 microsecond delay line 58, and 1 microsecond delay line 59. Also as before, the outputs of said delay lines are respectively fed through AND gates 60 through 63 and then in parallel to stages 66 through 69 of 4 megacycles per second shift register 70. Of course, also as before, the output of delay line 58 is fed back to one of the inputs of AND gate 52.

In actual practice, gate 51 may be considered to be the input AND gate and gate 52 the feedback AND gate. The clock signal is actually a train of one-half microsecond pulses with a repetition rate of 106 pulses per second. The output register shift pulse $P_s$ is a train of 0.1 microsecond pulses with a pulse repetition rate of $4 \times 10^6$ pulses per second. The sample pulses (S) and its complement are trains of one-half microsecond pulses with pulse repetition rates of $4 \times 10^3$ pulses per second. The sample pulse occurs simultaneously with every 250th clock pulse and with every 1000th output register shift pulse. The sample pulse (S) enables the input AND gate 51 for one-half microsecond to admit the signal sample and then inhibits the input AND gate for 249 clock pulses. Simultaneously, the complement (S̄) inhibits the feedback AND gate 52 for 1 clock pulse and enables it for 249 clock pulses. Thus, a signal sample is injected, the stored information advances through the delay elements of feedback loop 55 for 250 microseconds, then another signal sample is added thereto. The second sample will be added as the first sample enters the second delay element. The third sample will be added as the first sample enters the third delay element and the second sample enters the second delay element. Since the fourth delay element has only 249 microseconds delay, the first sample will have passed through it and be back in the first delay element 1 microsecond before the 5th sample pulse, and the 5th sample will then be added adjacent to it in the delay line. The foregoing sort of sampling procedure continues until all of the delay lines are timely filled with bit samples as follows: delay line 54—bits 4, 8, 12 . . . 999; delay line 56—bits 3, 7, 11 . . . 998; delay line 57—bits 2, 6, 10 . . . 997; delay line 58—bits 1, 5, 9 . . . 996. After the next sample pulse, the arrangement should be: delay line 54—bits 5, 9, 13 . . . 996, 1000; delay line 56—bits 4, 8, 12 . . . 999; delay line 57—bits 3, 7, 11 . . . 998; delay line 58—bits 2, 6, 10 . . . 997; delay line 59—bit 1. Bit #1 was blocked from reentering logic circuit and, consequently, the delay line by inverted sample signal (S̄) as it admitted bit #1000. This process continues with the older storage sample being discarded every time a new sample is added by the delay lines. Each clock pulse transfers the information from the delay line outputs to shift register 70 where it is shifted out serially before the next clock pulse. This operation produces an output every 250 microseconds which is a sped-up replica of the last 1000 data bits fed into the input of the subject system.

A slightly different configuration of the subject invention is depicted in FIG. 4. From an operational point of view, the stored information is recirculated around the individual delay elements consisting of the 125 microsecond delay lines and their respective associated AND gates and OR circuits. The number of times that said stored information is recirculated around said delay elements depends on the sampling rate and the frequency of the advanced pulse (A). When the advance pulse is applied at its input to the invention, the stored information is advanced around the complete loop of said delay elements for 125 microseconds. This gives a low input sample rate with respect to the output sample rate, which makes it possible to perform a different operation on the output during each recirculation around the loop consisting of the aforesaid delay elements. Actually, the subject invention may employ any sampling period $T_s = 125m$ microseconds, where $m$ is an integer. In this case, the storage signal samples are recirculated around the individual 125 microseconds delay loop for "$m-1$" recirculations and are then advanced in the 499.5 microsecond delay line for 125 microseconds, with a new sample added on the last 0.5 microsecond of the forward shift. For example, a sampling period of 1000 microseconds is obtained by making "$m$" equal to 8. The signal samples are recirculated around each of the 125 microsecond delay loops 7 times and are then advanced in the 499.5 microsecond delay loop for 125 microseconds, with a new sample added on the 1000th microsecond. The advance pulse (A) lasts for 125 microseconds with the sample pulse (S) occurring during the last microsecond of this period. If so desired, the multiple recirculation can be used to improve the filtering or the output can be processed 8 different ways during the 8 recirculations between the addition of new signal samples. In any event, the same storage signal will appear at the output each time during the 1000 microseconds. At the end of this period a new sample is added to the acoustic delay element. Thus, it can be seen that during each 1000 microseconds the aforesaid 8 different operations may be performed on the output.

The devices of FIGS. 4 and 5 each contain recirculation storage loops which are similar in substance as and which operate in accordance with the same general principles as the equivalent recirculation storage loops of the devices of FIGS. 2 and 3. Accordingly, it would appear that their respective operations would be sufficiently obvious to the artisan to make the further discussion thereof unnecessary, thereby enabling the simplification of this disclosure. Likewise, it would further appear that explanation of the operation of the transfer gate circuits of the device of FIGS. 5 and 6 are not required at this time, inasmuch as these circuits also function in a manner substantially similar to the operations defined in connection with the discussion of the operations of the devices of FIGS. 2 and 3 above. However, it can readily be seen that with respect to the device of FIG. 5, the series-parallel converter includes a plurality of electronic delay lines each of which have their own times of delay in order to delay the signal from their respective AND gate to the inputs of OR circuit 139. AND gate 133 does not have a delay line connected to its output because, in this case, it constitutes the first or initial signal which is applied to OR circuit 139. Subsequent to that and in timely succession the outputs of delays 138, 137, and 136 are applied thereto so as to create a serial signal having the binary characteristics that occurred in parallel in the bit storage devices of the recirculating storage loop at any given instant. Thus, it can be seen that the inputs to delays 136 through 138 and AND gate 133 constitute parallel inputs which are converted to a series thereof in the output from OR circuit 139.

Inspection of FIGS. 6 and 2 will disclose that storage loops 155 and 24 thereof, respectively, are essentially identical in structure. Furthermore, each thereof has a 1 bit storage (159 and 33) connected to the respective outputs of $m-1$ bit storage 158 and $m-1$ storage 32. Hence, the operations of these particular combinations of elements are similar and are essentially the same as described above in the operational description of the device of FIG. 2. But, as may readily be seen, the respective structures of transfer gate circuit 164 and parallel-series converter 171 of FIG. 6 are different from transfer gate circuit 27 and parallel-series converter 41 of FIG. 2; consequently, their respective functions are somewhat different, too, although the overall results produced thereby are substantially the same.

In the embodiment of FIG. 6, the parallel binary bit signals from the bit storages of storage loop 155 are simultaneously applied to one of the inputs of their respective AND gates located in transfer gate circuit 164. In addition, at the proper time (as controlled by the clock), a properly shaped clock pulse from pulse shaper 169 is applied to the other input of AND gate 160 and to the input of delay line 165. This causes AND gate 160 to be opened immediately to allow the binary bit from 1 bit storage 159 to pass therethrough and on to the input of OR circuit 170. At the same time, the output pulse from pulse shaper 169 begins its travel down delay line 165, and as it timely reaches the output of each successive delay section thereof, it is applied to the other inputs of AND gates 161, 162, and 163 for the timely opening thereof. As a result of this, the binary bit stored in bit storages 157, 156, and 154 are successively and timely passed therethrough and applied to the input of OR circuit 170 in that order. Hence, the binary bits stored in parallel in the bit storages of storage loop 155 at that particular cycle time are subsequently read out in serial and time-compressed form from the output of OR circuit 170.

As previously mentioned in conjunction with the operation of the various and sundry species of this invention, the waveforms of FIG. 7 are idealized and, of course, the idealization thereof has been defined generally therein as far as the time base abscissa is concerned as well as the ordinate values. This is due to the difficulty which arises in attempting to apply specific control pulse waveforms to both general and more particularized systems of the type constituting the instant invention. However, at this time, it should be understood that there are definite relationships between said control pulses which may be defined mathematically as follows.

Letting:

$\phi_c$=clock frequency,
$\phi_s$=sample pulse frequency,
$\phi_A$=advance pulse frequency,
$\phi_p$=shift pulse frequency,
$n$=number of storage elements in the recirculation loop,
$m$=an integer representing the number of bits of delay in each storage element,
$r$=the number of times the signal passes through a storage element between the addition of new samples.
$r-1$=the times around the minor loop and an advance of $m$ bits in the major loop for that species containing both loops.
$T_A$=advance pulse duration.
$T_{in}$=input signal storage time.

Then, the relationship of the clock pulse and output shift register pulse frequencies:

$$\phi_p = n\phi_c \text{ pulses per sec.}$$

and the sample pulse is $$\phi_s = \phi_c/mr \text{ pulses per sec.}$$

The advance pulse frequency $\phi_A$ is the same as the sample pulse frequency $\phi_s$ and is $$\phi_A = \phi_s = \phi_c/mr \text{ pulses per sec.}$$

The advance pulse duration $T_A$ is then $$T_A = m/\phi_c \text{ secs.}$$

and the input signal storage time $T_{in}$ is $$T_{in} = mn/\phi_s \text{ secs.}$$

Although for most practical purposes the foregoing mathematical definitions represent fairly optimum conditions, in view of the teachings herein presented, it would be well within the purview of one skilled in the art to make design changes as necessary to meet operational requirements of the aforementioned or other preferred species of the subject invention without violating the scope and spirit of thereof.

Obviously, many modifications and variations of the present invention are possible in the light of the above teachings. It is, therefore, to be understood, that within the scope of the appended claims, the invention may be practiced otherwise than is specifically described.

What is claimed and desired to be protected by Letters Patent of the United States is:

1. A series-parallel recirculation time compressor comprising in combination:
   means for receiving a plurality of predetermined actuation signals and timely producing an output signal therefrom in response thereto,
   a plurality of series connected delay lines coupled to the output of said actuation signal receiving means for delaying the output signal therefrom at predetermined successive intervals of time, means interposed between the output of one of said plurality of series connected delay lines and one of the inputs of the aforesaid actuation signal receiving means for supplying a predetermined delayed portion of the output signal therefrom as one of the actuation signals thereto, a shift register having a plurality of stages adapted for simultaneously receiving a plurality of parallel input signals and timely producing a serial output signal containing same upon the shifting thereof by a given pulse, and gating means interconnecting the outputs of said delay lines and the inputs of said shift register for timely supplying the predetermined successively delayed signals therefrom thereto as the aforesaid plurality of parallel input signals.

2. The invention according to claim 1 wherein said means for receiving a plurality of predetermined actuation signals and timely producing an output signal therefrom in response thereto is a logic circuit.

3. A series-parallel recirculation time compressor comprising in combination:

a first AND gate having a plurality of inputs and an output with the inputs thereof responsive to a data signal and a plurality of predetermined timing signals, respectively, a second AND gate having a plurality of inputs and an output with the inputs thereof responsive to an appropriately delayed feedback signal and a plurality of predetermined timing signals respectively, an OR circuit having a pair of inputs respectively connected to the outputs said first and second AND gates, and an output, a plurality of series connected delay lines coupled to the output of said OR circuit, means connected between the output of the penultimate one of said series connected delay lines and one of the inputs of said second AND gate for supplying the aforesaid appropriately delayed feedback signal thereto, a shift register having a plurality of stages, and a plurality of AND gates having one of the inputs thereof interconnected and the other inputs thereof respectively connected to the outputs of said plurality of series connected delay lines with the exception of the aforesaid penultimate delay line and the outputs thereof respectively connected to the plurality of stages of said shift register.

4. The invention according to claim 3 further characterized by a pulse shaper having an input responsive to a predetermined timing signal and an output with the output thereof coupled to the interconnected inputs of the aforesaid AND gates.

5. A series-parallel recirculation time compressor comprising in combination:

means for receiving, intermittently storing, and recirculating a binary signal within an electrical loop, means for converting a plurality of parallel signals into a serial signal, and means interconnecting the outputs of said receiving, storing, and recirculating means and the respective inputs of the aforesaid converting means for timely transferring the signals stored therein thereto.

6. The device of claim 5 wherein said means for converting a plurality of parallel signals into a serial signal comprises:

a multi-section delay line the successive sections of which are series connected.

7. The device of claim 5 wherein said means for converting a plurality of parallel signals into a serial signal comprises:

a multi-stage shift register.

8. The device of claim 5 wherein said means for converting a plurality of parallel signals into a serial signal comprises:

a plurality of delay lines.

9. A series-parallel time compressor comprising in combination:

a pair of AND gates each of which have a trio of inputs and an output, a first OR circuit connected to the outputs of said AND gates, a plurality of series-connected bit storage devices coupled to the output of said OR circuit, means connected to the penultimate one of said plurality of series-connected bit storage devices for feeding the output thereof back to one of the inputs of one of the aforesaid pair of AND gates, a plurality of AND gates each of which has a pair of inputs and an output with one of the inputs thereof respectively connected to the output of each of the aforesaid plurality of series-connected bit storage devices, a pulse shaper coupled to the other inputs of each of said plurality of AND gates, a plurality of electronic delay lines respectively connected to the outputs of each of said plurality of series-connected AND gates except the last one thereof, and a second OR circuit coupled to the outputs of said plurality of electronic delay lines and the output of the last AND gate of the aforesaid plurality of AND gates.

10. A series-parallel time compressor comprising in combination:

a pair of AND gates each of which have a trio of inputs and an output, a first OR circuit connected to the outputs of said AND gates, a plurality of series-connected bit storage devices coupled to the output of said OR circuit, means connected to the penultimate one of said plurality of series-connected bit storage devices for feeding the output thereof back to one of the inputs of one of the aforesaid pair of AND gates, a plurality of AND gates each of which has a pair of inputs and an output with one of the inputs thereof respectively connected to the output of each of the aforesaid plurality of series-connected bit storage devices, a multi-section electronic delay line having an input and an output at each of the delay sections thereof with each of said delay section outputs respectively connected to the other input of each of said plurality of, AND gates except the last one thereof, a pulse shaper coupled to the input of said multi-section electronic delay line and the other input of the last one of said plurality of AND gates, and a second OR circuit connected to the outputs of each of said plurality of AND gates.

11. A series-parallel recirculation time compressor comprising in combination:

a pair of AND gates each of which has a trio of inputs and an output, an OR circuit having a pair of inputs and an output with the inputs thereof respectively connected to the outputs of said pair of AND gates, means coupled to the output of said OR circuit for delaying the output signal therefrom predetermined successive periods of time, means for receiving and storing a plurality of parallel input signals and timely producing same as a serial output therefrom upon actuation thereof by a given pulse signal, and means interconnecting the aforesaid delaying means and said receiving and storing means for timely gating the successively delayed output signals therefrom thereinto as said plurality of parallel input signals.

12. A series-parallel recirculation time compressor comprising in combination:
- a plurality of pairs of AND gates each of which has a plurality of inputs and an output,
- a plurality of OR circuits having a pair of inputs and an output with the inputs of each thereof respectively connected to the outputs of a predetermined pair of the aforesaid plurality of pairs of AND gates,
- means coupled to the outputs of said plurality of OR circuits for delaying the output signals therefrom predetermined successive periods of time,
- means for receiving and storing a plurality of parallel input signals and timely producing same as a serial output therefrom upon actuation thereof by a given pulse signal, and
- means interconnecting the aforesaid delaying means and said receiving and storing means for timely gating the successively delayed output signals therefrom thereinto as said plurality of parallel input signals.

References Cited by the Examiner
UNITED STATES PATENTS

| | | | |
|---|---|---|---|
| 2,711,499 | 6/1955 | Lippel | 340—347 |
| 2,811,713 | 10/1957 | Spencer | 340—347 |
| 2,831,058 | 4/1958 | Finch | 340—347 |
| 2,951,905 | 9/1960 | Plouffee et al. | 179—15.57 |
| 2,958,039 | 10/1960 | Anderson. | |
| 2,959,641 | 11/1960 | Hufnagel | 179—15.57 |
| 3,097,338 | 7/1963 | Pinet et al. | |

DAVID G. REDINBAUGH, *Primary Examiner.*

C. L. JUSTUS, DAVID G. REDINBAUGH, *Examiners.*

P. M. HINDERSTEIN, J. T. STRATMAN,
*Assistant Examiners.*